United States Patent [19]
Cipolli et al.

[11] Patent Number: 5,629,382
[45] Date of Patent: *May 13, 1997

[54] SELF-EXTINGUISHING POLYMERIC COMPOSITIONS

[75] Inventors: Roberto Cipolli, Novara; Roberto Oriani, Milan; Enrico Masarati, Castelnuovo Valtidone; Gilberto Nucida, San Giuliano Milanese, all of Italy

[73] Assignee: Ministero Dell'Universita'e Della Ricerca Scientifica e Tecnologica, Rome, Italy

[*] Notice: The term of this patent shall not extend beyond the expiration date of Pat. No. 5,302,641.

[21] Appl. No.: 307,103

[22] Filed: Sep. 16, 1994

Related U.S. Application Data

[63] Continuation of Ser. No. 976,454, Nov. 13, 1992, abandoned.

[30] Foreign Application Priority Data

Nov. 14, 1991 [IT] Italy .................... MI91A3043

[51] Int. Cl.⁶ .................... C08L 61/20; C08L 61/28; C08L 61/37; C08L 23/06
[52] U.S. Cl. .................... 525/158; 525/164; 525/509; 525/515; 525/517; 525/518; 524/115; 524/121; 524/154
[58] Field of Search .................... 525/158, 164, 525/509, 515, 517, 518; 524/115, 121, 154

[56] References Cited

U.S. PATENT DOCUMENTS

| | | | |
|---|---|---|---|
| 2,524,727 | 10/1950 | Dudley | 260/67.7 |
| 4,639,331 | 1/1987 | Elsner et al. | 252/609 |
| 4,670,484 | 6/1987 | Fuchs et al. | 523/205 |
| 4,701,373 | 10/1987 | Fuchs et al. | 428/326 |
| 4,727,102 | 2/1988 | Scarso | 524/100 |
| 4,772,642 | 9/1988 | Staendeke | 523/205 |
| 4,957,950 | 9/1990 | Staendeke et al. | 523/205 |
| 4,997,876 | 3/1991 | Scarso | 524/706 |
| 5,096,961 | 3/1992 | Eberspach | 524/707 |
| 5,104,986 | 4/1992 | Cipolli et al. | 544/198 |
| 5,116,891 | 5/1992 | Eberspach et al. | 524/97 |
| 5,124,379 | 6/1992 | Cipolli et al. | 524/97 |
| 5,153,245 | 10/1992 | Cipolli et al. | 524/100 |
| 5,182,388 | 1/1993 | Cipolli et al. | 544/195 |
| 5,200,445 | 4/1993 | Cipolli et al. | 524/100 |
| 5,210,120 | 5/1993 | Cipolli et al. | 524/100 |
| 5,223,560 | 6/1993 | Cipolli et al. | 524/100 |
| 5,225,463 | 7/1993 | Cipolli et al. | 524/97 |
| 5,302,640 | 4/1994 | Cipolli et al. | 524/100 |
| 5,302,641 | 4/1994 | Cipolli et al. | 524/100 |
| 5,302,642 | 4/1994 | Cipolli et al. | 524/100 |
| 5,304,646 | 4/1994 | Cipolli et al. | 544/204 |
| 5,310,907 | 5/1994 | Cipolli et al. | 544/209 |
| 5,312,853 | 5/1994 | Staendeke et al. | 524/100 |
| 5,314,938 | 5/1994 | Cipolli et al. | 524/100 |
| 5,321,057 | 6/1994 | Cipolli et al. | 523/208 |
| 5,331,030 | 7/1994 | Cipolli et al. | 524/100 |
| 5,359,064 | 10/1994 | Cipolli et al. | 544/195 |
| 5,389,707 | 2/1995 | Cipolli et al. | 524/100 |

FOREIGN PATENT DOCUMENTS

| | | |
|---|---|---|
| 0014463 | 8/1980 | European Pat. Off. . |
| 0193793 | 9/1986 | European Pat. Off. . |
| 0415371 | 3/1991 | European Pat. Off. . |
| 0441134 | 8/1991 | European Pat. Off. . |
| 1286661 | 8/1972 | United Kingdom . |

OTHER PUBLICATIONS

*Encyclopedia of Polymer Science & Engineering*, vol. 1, p. 759 (1985).

*Primary Examiner*—W. Robinson H. Clark
*Attorney, Agent, or Firm*—Oblon, Spivak, McClelland, Maier & Neustadt, P.C.

[57] ABSTRACT

Self-extinguishing polymeric compositions comprising ammonium polyphosphate having the general formula (I):

$$(NH_4)_{n+2}P_nO_{3n+1} \quad (I)$$

microencapsulated with condensation compounds obtained by means of the polymerization of polyaminic compositions essentially constituted by derivatives of 2,4,6-triamino-1,3,5-triazine, having the general formula (II):

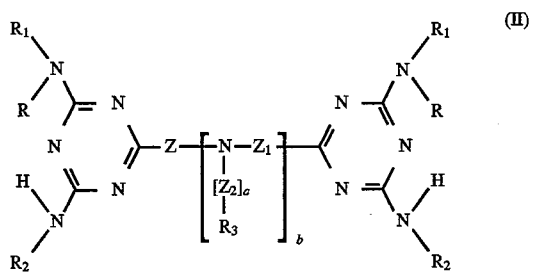

with aldehydes, preferably formaldehyde.

36 Claims, No Drawings

SELF-EXTINGUISHING POLYMERIC COMPOSITIONS

This application is a Continuation of application Ser. No. 07/976,454, filed on Nov. 13, 1992, now abandoned.

The present invention relates to self-extinguishing polymeric compositions either based on thermoplastic polymers or on polymers endowed with elastomeric properties, in particular olefinic polymers or copolymers, containing composites constituted by ammonium polyphosphate microencapsulated with aminoplastic resins.

In the art several solutions are known in order to reduce or eliminate the combustibility of polymers. Some of such solutions are based on the use of metal compounds, in particular compounds of antimony, bismuth or arsenic, in combination with partially halogenated, thermally unstable organic compounds, such as chlorinated paraffinic waxes.

Other solutions are based on the use of substances capable of causing intumescence. The formulations of intumescent type are generally constituted by the polymer and at least three main additives: one essentially phosphorus containing additive, whose purpose is of forming, during the combustion, a semi-solid, impermeable glassy layer essentially constituted by polyphosphoric acid, and of initiating the process of intumescence formation; a second, nitrogen containing, additive, which performs the task of foaming agent; and a third, carbon containing, additive, which acts as a carbon donor, in order to form an insulating, cellular carbonaceous layer (char) between the polymer and the flame.

Examples of this type of intumescent formulations are those as reported in the following patents: U.S. Pat. No. 3,810,862 (Phillips Petroleum Co.), based on melamine, pentaerythritol and ammonium polyphosphate, U.S. Pat. No. 4,727,102 (Vamp S.r.l), based on melamine cyanurate, a hydroxyalkyl derivative of isocyanuric acid and ammonium polyphosphate, and published patent application WO 85/05626 (Plastcoat U.K. Limited), based on various phosphorus and nitrogen compounds among which, in particular, a combination of melamine phosphate, pentaerythritol and ammonium polyphosphate may be cited.

In more recent formulations, together with the use of an organic or inorganic phosphorus compound, a nitrogen containing organic compound was used, in general an aminoplastic resin obtained by means of the condensation of urea, melamine or dicyandiamide with formaldehyde.

Examples of double additive formulations are those as reported in U.S. Pat. No. 4,504,610 (Montedison S.p.A.) based on oligomeric derivatives of 1,3,5-triazine and ammonium polyphosphate, and European patent 14,463 (Montedison S.p.A.), based on organic compounds selected from benzylguanamine and reaction products of aldehydes with various nitrogen containing cyclic compounds, in particular benzylguanamineformaldehyde copolymers, and ammonium polyphosphate.

Self-extinguishing compositions can also be obtained by using single component additives, containing both nitrogen and phosphorus in their organic molecule, as disclosed in U.S. Pat. No. 4,201,705 (Borg-Warner Corp.).

These flame retardant, intumescent systems endow the polymer which contains them with the property of giving rise to the formation of a carbonaceous residue following a fire or the application of a flame. This type of flame retardant systems display a number of advantages: absence of phenomena of corrosion in the machinery on which polymers are processed; lower smoke emission than as of those systems which contain metal compounds and halogenated hydrocarbons; and, above all, the possibility of endowing the polymers with satisfactory flame retardant properties with a smaller amount of total additive, and, therefore, without an excessive decay in mechanical properties of the same polymers.

As disclosed hereinabove, the intumescent formulations constituted by three or two components prevailingly use, as said hereinabove, ammonium polyphosphate as their phosphorus containing additive.

The nearly exclusive use of ammonium polyphosphate in the intumescent type of formulations, as compared to ammonium or amine phosphates and/or phosphonates is, as compared to them, essentially due to its higher thermal stability and lower water solubility.

In spite of that, ammonium polyphosphate suffers still from some limitations as regards its solubility in water, in particular in hot water.

In fact, those ammonium polyphosphates are preferred which are encompassed by the general formula $$(NH_4)_{n+2}P_nO_{3n+1}$$

in which n represents an integer equal to, or higher gthan, 2; preferably, the molecular weight of polyphosphates should be high enough in order to secure a low water solubility. For indicative purposes, the value of n is preferably comprised within the range of from 2 to 500.

The composition of polyphosphates having the above indicated formula, in which n is a large enough number and is preferably comprised within the range of from 50 to 500, practically is that composition which corresponds to the formula of metaphosphates $$(NH_4PO_3)_n.$$

An example of such polyphosphates is the product known under the trade name "Exolit 422" (produced and traded by Hoechst) and having the composition $(NH_4PO_3)_n$ in which n is higher than 50; another example is the product known under the trade name "Phos-Check P/40" (Monsanto Chemical), and having a similar composition.

The contrivance which drastically reduced the solubility of ammonium polyphosphate in water is the process of microencapsulation thereof inside water insoluble resins of various chemical kinds.

Furthermore, such a treatment additionally endows ammonium polyphosphate with higher free-flowing characteristics, above all as regards its use as flame-retardant additive in polyurethanic foams.

Examples of microencapsulated ammonium polyphosphate are those as reported by U.S. Pat. No. 4,347,334, with phenol-formaldehyde resin; U.S. Pat. No. 4,467,056 and European patent No. 180,795, with melamine-formaldehyde resin; European patent No. 180,790, with polyureas; U.S. Pat. No. 4,514,328, with epoxy resins; and European patent No. 178,564, with poly isocyanurates.

An example of such microencapsulated polyphosphates is the product known under the trade name "Exolit 462" (manufactured and traded, like the following products, by Hoechst A. G.), and corresponding to ammonium polyphosphate (APP) microencapsulated in melamine-formaldehyde resin; another example is the product known under the trade name "Exolit 455" and corresponding to APP microencapsulated in epoxy resin; still a further product is "Exolit 470", which corresponds to APP microencapsulated in poly carbodiimidic resin.

The use of the above said microencapsulated products in intumescent polymeric formulations is reported, e.g., by the following patents: European patent No. 193,793 (Hoechst A. G.), in which Exolit 462 and Exolit 455 products are blended with ethyleneureaformaldehyde polycondensate; European patent No. 258,685 (Hoechst A. G.), in which Exolit 462 and Exolit 470 products are blended with tris(2-hydroxyethyl) isocyanurate (THEIC), and published patent application WO 89/01011 (VAMP S.r.l.), in which Exolit 455 product is blended with a polymer of tris(2-hydroxyethyl)isocyanurate (poly THEIC).

As one can observe from the above cited examples, the various microencapsulated ammonium polyphosphate products do not render intumescent the polymeric compositions which contain them, but, in order to perform their action, they require that an organic component is present, which acts as a carbon donor for char formation.

In other terms, the process of ammonium polyphosphate microencapsulation only improves, as already said, its high temperature insolubility, but does not modify the characteristics thereof as a flame-retardant additive for intumescent formulations.

The present Applicant has found now that, contrarily to the teachings of the prior art, excellent self-extinguishing characteristics can be supplied to polymer by means of the use of ammonium polyphosphate microencapsulated with a novel class of polycondensed nitrogenous compounds, without using any further co-additives.

Such a result is surprising, because it is obtained with ammonium polyphosphate microencapsulated with simple structure aminoplastic resins, prepared by means of the resinification with aldehydes, preferably formaldehyde, of polyaminic composition, essentially constituted by derivatives of 2,4,6-triamino-1,3,5-triazine.

As already said hereinabove, reaction products of aldehydes and various nitrogenous cyclic compounds are known in the art (European patent EP 14,463), which can be used, toghether with ammonium polyphosphate, for self-extinguishing composition in various polymeric matrixes, in particular polyolefins.

Although they display a good activity as flame-retardant agents, such compounds, such as, e.g., ethyleneureaformaldehyde copolymer, endow the polymeric compositions which contain them with a limited heat stability both during the processing and compounding steps (extrusion and moulding processes) and to thermooxidation, and furthermore require, in order to perform their action, a considerably large content of phosphorous containing co-additive, Other compounds, such as, e.g., melamine-formaldehyde copolymer, used in many examples as the resins for ammonium polyphosphate microencapsulation, results to be unsuitable to confer self-extiguishing properties to the above said polymer, even when they are used in larger amount than as used for the microencapsulation as such.

Also the use of mixed compounds, such as, e.g., ethyleneurea-melamine-formaldehyde terpolymer, is not enough in order to cause the polymeric compositions to reach satisfactory values of heat stability, although it contributes to improve it.

On the contrary, the use of microencapsulated ammonium polyphosphate according to the present invention, makes it possible self-extinguishing polymeric compositions to be obtained which are endowed with good thermal stability both during the polymer processing step and to thermooxidation, thus making it possible the compounding process to be carried out at higher temperatures than as allowed by the ammonium polyphosphate/aminoplastic resin mixtures known from the prior art.

The microencapsulated ammonium polyphosphate according to the present invention retains furthermore the low values of water solubility, both at high and at low temperature, which are typical of the analogous products known from the prior art and, above all, displays, as compared to them, a good stability to heating, thusly retaining a high activity as a flame retardant also after the processes of high temperature processing of the polymeric compositions which contain it.

Finally, the polymeric compositions according to the present invention display the advantage that they, in the case of a fire, give rise to a very moderate and non obscuring smoke emission.

Therefore, the subject matter of the present invention are the self-extinguishing polymeric compositions comprising:
(a) from 90 to 40 parts by weight of a thermoplastic polymer, or of a polymer endowed with elastomeric properties;
(b) from 10 to 60, preferably from 15 to 40, parts by weight of one or more composites constituted by ammonium polyphosphate of general formula (I):

$$(NH_4)_{n+2}P_nO_{3n+1} \qquad (I)$$

wherein n stands for an integer comprised within the range of from 2 to 800, preferably of from 5 to 500, microencapsulated with 10-80%, preferably 15-60%, by weight of a resin obtained by polymerizing with aldehydes a mixture comprising:
(1) from 0 to 50 parts by weight of one or more polyaminic derivatives;
(2) from 50 to 100 parts by weight of one or more derivatives of 2,4,6-triamino-1,3,5-triazine having the general formula (II):

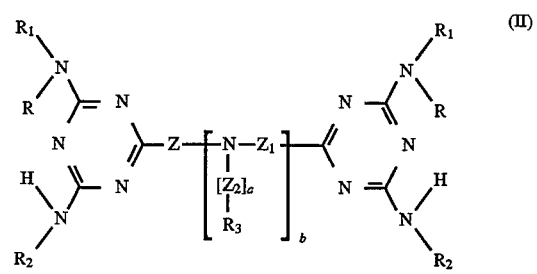

wherein:
the radicals from R to $R_2$, which may be the same, or different from each other, and which may have different meanings on each triazinic ring, are:
H; $C_1-C_{18}$ alkyl; $C_2-C_8$ alkenyl; $C_6-C_{16}$ cyctoalkyl or alkylcycloalkyl, possibly substituted with a hydroxy or $C_1-C_4$ hydroxyalkyl function;

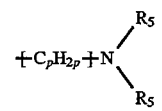

wherein:
m=an integer comprised within the range of from 2 to 8, and preferably of from 2 to 4;
p=an integer comprised within the range of from 2 to 6;
$R_4$=H; $C_1-C_8$ alkyl, preferably H or $C_1-C_4$ alkyl; $C_2-C_6$ alkenyl; -[-$C_qH_{2q}$-]-O-$R_6$ wherein q is an integer comprised within the range of from 1 to 4 and $R_6$ is H or $C_1-C_4$ alkyl; $C_6-C_{12}$ cycloalkyl or alkylcycloalkyl;

the radicals $R_5$, which may be the same, or different from each other, are:

H, $C_1$–$C_8$ alkyl; $C_2$–$C_6$ alkenyl; $C_6$–$C_{12}$ cycloalkyl or alkylcycloalkyl; $C_1$–$C_4$ hydroxyalkyl; or the moiety:

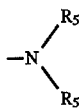

is replaced by a heterocyclic radical linked to the alkyl chain through the nitrogen atom, and possibly containing another heteroatom preferably selected from O, S, N;

or in the general formula (II) the moiety:

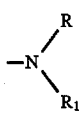

is replaced by a heterocyclic radical linked to the triazinic ring through the nitrogen atom, and possibly containing another heteroatom preferably selected from
O, S, N;
a is 0 (zero) or 1;
b is 0 (zero) or an integer comprised within the range of from 1 to 5;
$R_3$ is hydrogen or:

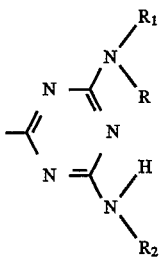

and its meaning may vary within each repeating unit; when b is 0 (zero), Z is a divalent radical falling within the scope of one of the following formulas:

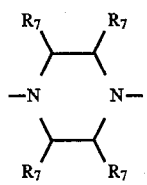
(III)

wherein the radicals $R_7$, which may be the same or different from each other, are hydrogen or $C_1$–$C_4$ alkyl;

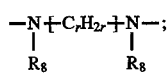
(IV)

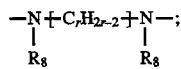
(V)

wherein r is an integer comprised within the range of from 2 to 14; $R_8$ is hydrogen; $C_1$–$C_4$ alkyl; $C_2$–$C_6$ alkenyl; $C_1$–$C_4$ hydroxyalkyl;

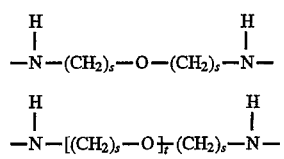

(VI)

(VII)

wherein s is an integer comprised within the range of from 2 to 5 and t is an integer comprised within the range of from 1 to 3;

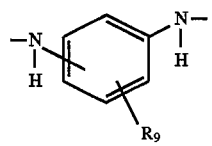
(VIII)

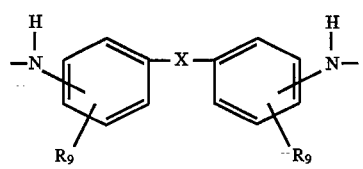
(IX)

wherein:

X is a direct C—C bond; O; S; S—S; SO; $SO_2$; NH; $NHSO_2$; NHCO; N=N; $CH_2$;

$R_9$ is hydrogen; hydroxy; $C_1$–$C_4$ alkyl; $C_1$–$C_4$ alkoxy;

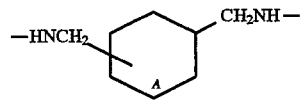
(X)

wherein A may be a saturated or unsaturated ring;

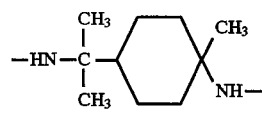
(XI)

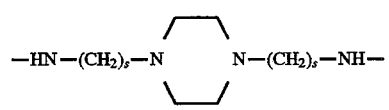
(XII)

wherein s has the above defined meaning; when, on the contrary, b is an integer comprised within the range of from 1 to 5, the moiety:

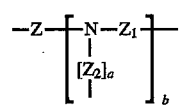

is a multivalent radical falling within the scope of one of the following formulas:

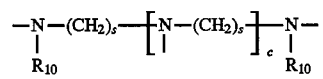
(XIII)

wherein:
$R_{10}$ is hydrogen or $C_1$–$C_4$ alkyl;
c is an integer comprised within the range of from 1 to 5;
the indexes s, which may be the same, or different from each other, have the same meaning as defined hereinabove;

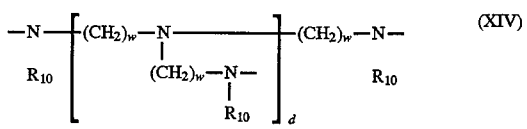

wherein:
R$_{10}$ has the same meaning as defined hereinabove;
w is an integer comprised within the range of from 2 to 4;
d is either 1 or 2.

According to a preferred form of practical embodiment of the composite according to the present invention, the polyaminic derivative is selected from compounds containing the 1,3,5-triazine ring, or at least one >C=O and/or >C=S moiety.

Also those derivatives having an asymmetrical structure, in the sense that the radicals R, R$_1$ and R$_2$ may have different meanings on each triazinic ring, fall within the scope of general formula (II).

The (1) and (2) components shall be selected in such a way as to secure a high level of crosslinking with the aldehydes, in order to maximize the microencapsulation of ammonium polyphosphate and consequently reduce its water solubility down to very low values.

Preferably, the aldehyde is formaldehyde or a mixture containing formaldehyde and, up to 20% by mol, another aldehyde with general formula (XV):

R$_{11}$—CHO (XV)

wherein R$_{11}$ is C$_1$-C$_8$ alkyl; C$_2$-C$_6$ alkenyl, C$_6$-C$_{12}$ cycloalkyl; C$_6$-C$_{12}$ aryl.

However, formaldehyde is the preferred aldehyde.

Examples of ammonium polyphosphate of general formula (I) are: ammonium pyrophosphate; ammonium tripolyphosphate; commercial ammonium polyphosphate, such as, for example, those ammonium polyphosphate grades respectively known under the marks "Exolit 422" (manufactured and marketed by Hoechst) and "Phos-Chek P/40" (Monsanto Chemical).

Examples of radicals from R to R$_2$ in general formula (II) are:

methyl; ethyl; propyl; isopropyl; n-butyl; isobutyl; tert-butyl; n-pentyl; isopentyl; n-hexyl; tert-hexyl; octyl; tert-octyl; decyl; dodecyl; octadecyl; ethenyl; propenyl; butenyl; isobutenyl; hexenyl; octenyl; cyclohexyl; propylcyclohexyl; butylcyclohexyl; decylcyclohexyl; hydroxycyclohexyl; hydroxyethylcyclohexyl; 2-hydroxyethyl; 2-hydroxypropyl; 3-hydroxypropyl; 3-hydroxybutyl; 4-hydroxybutyl; 3-hydroxypentyl; 5-hydroxypentyl; 6-hydroxyhexyl; 3-hydroxy-2,5-dimethylhexyl; 7-hydroxyheptyl; 7-hydroxyoctyl; 2-methoxyethyl; 2-methoxypropyl; 3-methoxypropyl; 4-methoxybutyl; 6-methoxyhexyl; 7-methoxyheptyl; 7-methoxyoctyl; 2-ethoxyethyl; 3-ethoxypropyl; 4-ethoxybutyl; 3-propoxypropyl; 3-butoxypropyl; 4-butoxybutyl; 4-isobutoxybutyl; 5-propoxypentyl; 2-cyclohexyloxyethyl; 2-ethenyloxyethyl; 2-(N,N-dimethylamino)ethyl; 3-(N,N-dimethylamino)propyl; 4-(N,N-diethylamino)butyl; 5-(N,N-diethylamino) pentyl; 5-(N,N-diisopropylamino)pentyl; 3-(N-ethylamino) propyl; 4-(N-methylamino)butyl; 5-(N,N-diethylamino)pentyl; 3-(N-ethylamino)propyl; 4-(N-methylamino)butyl; 4-(N,N-dipropyliano)butyl; 2-(N,N-diisopropylamino) ethyl; 6-(N-hexenylamino)hexyl; 2-(N-ethenylamino) ethyl; 2-(N-cyclohexylamino) ethyl; 2-(N-2-hydroxyethylamino)ethyl; 2-(2-hydroxyethoxy)ethyl; 2-(2-methoxyethoxy)ethyl; 6-(N-propylamino)hexyl; and so forth.

Examples of heterocyclic radicals which may replace the moiety:

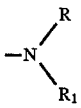

in general formula (II) are: aziridine; pyrrolidine; piperidine; morpholine; thiomorpholine; piperazine; 4-methylpiperazine; 4-ethylpiperazine; 2-methylpiperazine; 2,5-dimethylpiperazine; 2,3,5,6-tetramethylpiperazine; 2,2,5,5-tetramethylpiperazine; 2-ethylpiperazine; 2,5-diethylpiperazine; and so forth.

Examples of heterocyclic radicals which may replace the moiety:

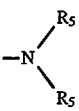

are:

aziridine; pyrrolidine; piperidine; morpholine; thiomorpholine; piperazine; 4-methylpiperazine; 4-ethylpiperazine; and so forth.

Examples of divalent —Z— radicals are those which derive, by elimination of a hydrogen atom from each amine group, from the following diaminic compounds: piperazine; 2-methyl piperazine; 2,5-dimethylpiperazine; 2,3,5,6-tetramethyl piperazine; 2-ethylpiperazine; 2,5-diethyl piperazine; 1,2-diaminoethane; 1,3-diaminopropane; 1,4-diaminobutane; 1,5-diaminopentane; 1,6-diaminohexane; 1,8-diaminooctane; 1,10-diaminodecane; 1,12-diaminododecane; N,N'-dimethyl-1,2-diaminoethane; N-methyl-1,3-diaminopropane; N-ethyl-1,2-diaminoethane; N-isopropyl-1,2-diaminoethane; N-(2-hydroxyethyl)-1,2-diaminoethane; N,N'-bis(2-hydroxyethyl)-1,2-diaminoethane; N-(2-hydroxyethyl)-1,3-diaminopropane; N-hexenyl-1,6-diaminohexane. N,N'-diethyl-1,4-diamino-2-butene; 2,5-diamino-3-hexene; 2-aminoethyl ether; (2-aminoethoxy) methylether; 1,2-bis(2-aminoethoxy) ethane; 1,3-diaminobenzene; 1,4-diaminobenzene; 2,4-diaminotoluene; 2,4-diaminoanisole; 2,4-diaminophenol; 4-aminophenylether; 4,4'-methylenedianiline; 4,4'-diaminobenzanilide; 3-aminophenylsulfone; 4-aminophenylsulfone; 4-aminophenylsulfoxide; 4-aminophenyldisulfide; 1,3-bis(aminomethyl)benzene; 1,4-bis(aminomethyl)benzene; 1,3-bis(aminomethyl) cyclohexane; 1,8-diamino-p-mentane; 1,4-bis(2-aminoethyl)piperazine; 1,4-bis(3-aminopropyl)piperazine; 1,4-bis(4-aminobutyl)piperazine; 1,4-bis(5-aminopentyl) piperazine; and so forth.

Examples of multivalent radicals:

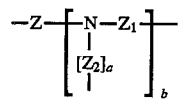

are those which derive, by elimination of a hydrogen atom from each reacted amino group, from the following polyaminic compounds:

bis(2-aminoethyl)amine; bis(3-aminopropyl)amine; bis (4-aminobutyl)amine; bis(5-aminopentyl)amine; bis[2-

(N-methylamino)ethyl]amine; 2-N-butyl-bis(2-aminoethyl)amine; bis[3-(N-methylamino)propyl]amine; N-(3-aminopropyl)-1,4-diaminobutane; N-(3-aminopropyl)-1,5-diaminopentane; N-(4-aminobutyl)-1,5-diaminopentane; tris(2-aminoethyl)amine; tris(3-aminopropyl)amine; tris(4-aminobutyl)amine; tris[2-(N-ethylamino)ethyl]amine; N,N'-bis(2-aminoethyl)-1,2-diaminoethane; N,N'-bis(3-aminopropyl)-1,3-diaminopropane; N,N'-bis(2-aminoethyl)-1,3-diaminopropane; N,N'-bis(3-aminopropyl)-1,2-diaminoethane; N,N'-bis(3-aminopropyl)-1,4-diaminobutane; bis[2-(2-aminoethyl)aminoethyl]amine; N,N'-bis[2-(2-aminoethyl)aminoethyl]-1,2-diaminoethane; N,N'-bis[3-(2-aminoethyl)aminopropyl]-1,2-diaminoethane; N,N,N',N'-tetrakis(2-aminoethyl)-1,2-diaminoethane; and so forth.

Examples of polyaminic derivatives are: urea; ethyleneurea; thiourea; ethylenethiourea; propyleneurea; melamine; acetoguanamine; propionoguanamine; butyroguanamine; isobutyroguanamine; caprinoguanamine; succinoguanamine; benzoguanamine; metamethylbenzoguanamine; benzylguanamine; hydantoin; piperazine-2,5-dione; barbituric acid; and so forth.

By "formaldehyde", as this term is used in the instant disclosure and in the appended claims, any forms are meant, in which formaldehyde is usually marketed: aqueous solution, metaformaldehyde, paraformaldehyde.

Examples of radicals $R_{11}$ are:
methyl; ethyl; n-propyl; n-butyl; n-hexyl; n-octyl; ethenyl; propenyl; cyclohexyl; phenyl; and so forth.

The composites according to the present invention can be synthetized as follows:

(i) by reacting in solution, with a suitable solvent (such as, e.g., methyl alcohol, ethyl alcohol, water or their mixtures, and so forth), the derivative of 2,4,6-triamino-1,3,5-triazine having the general formula (II), either mixed or not mixed with the polyaminic derivative, with aldehydes. The molar ratio of the triazinic derivative of general formula (II), or of its mixture with the polyaminic derivative, to the aldehydes, is comprised within the range of from 1:1 to 1:12. The reaction is carried out at a pH value comprised within the range of from 7 to 12, possib obtained by adding an alkali (such as, for example, potassium carbonate, sodium carbonate, sodium hydroxide, and so forth), at temperatures comprised within the range of from 20° C. up to boiling point of the solvent. A finely subdivided dispersion is obtained;

(ii) causing the resulting reaction product to turn into a resin by feeding it onto a dispersion of ammonium polyphosphate having the general formula (I), in finely subdivided form, with particle size smaller than 70 micrometers, in a liquid of the above mentioned type having a pH value comprised within the range of from 1 to 5, and heated at a temperature of from 40° C. to 150° C. pH values comprised within the range of from 1 to 5 can be obtained by possibly adding an acid (such as, e.g., sulfuric acid, hydrochloric acid, phosphoric acid, and so forth) to said dispersion. The resulting mixture is kept further stirred at the selected temperature, during the necessary time to complete the resinification and microencapsulation process, preferably of from 1 to 12 hours. The resulting product, constituted by microencapsulated ammonium polyphosphate, is filtered off.

The composite is first dried at 100° C., then is submitted to thermal treatment for some hours, preferably from 1 to 3 hours, in a vacuum oven at 150° C.

Generally, a good quality composite is obtained as a white crystalline powder, with a distribution of particle size which is substantially identical to the particle size distribution of ammonium polyphosphate used.

Possibly present agglomerates of material are easily broken without causing the particle coating to be fractured.

The composite according to the present invention can be used in self-extinguishing polymeric compositions without any further treatments.

The effectiveness of ammonium polyphosphate microencapsulation is evaluated by measuring the solubility of the obtained composite in water at 60° C., according to a process disclosed in the following.

An alternative synthesis route consists in causing the reactions of steps (i) and (ii) to take place as one single step, at a pH value comprised within the range of from 1 to 5, and at a higher temperature than 40° C.

Many of the derivatives of 2,4,6-triamino-1,3,5-triazine with general formula (II) are known; they can anyway be easily synthetized according to as disclosed in European Patent application publication No. 415,371, to the same Applicant's name.

The (b) component is preferably constituted by ammonium polyphosphate microencapsulated with aminoplastic resins obtained by means of the polymerization with formaldehyde of the only derivatives of general formula (II), in which R and/or $R_1$ are equal to hydrogen, or of their mixture with melamine.

Polymeric compositions also having self-extinguishing characteristics can be obtained by adding to microencapsulated ammonium polyphosphate according to the present invention both ammonium or amine phosphates and/or phosphonates, and organic compounds which are usually used in intumescent formulations as carbon donors for char formation.

Among those polymers which can be used in the composition of the present invention, preferred are polymers or copolymers of olefins having the general formula

$$R\text{—}CH\text{=}CH_2$$

wherein R is a hydrogen atom or a $C_1$–$C_8$ alkyl or aryl radical, in particular:

1. isotactic or prevailingly isotactic polypropylene;
2. HDPE, LLDPE, LDPE polyethylene;
3. crystalline propylene copolymers with minor proportions of ethylene and/or other alpha-olefins, such as, e.g., 1-butene, 1-hexene, 1-octene, 4-methyl-1-pentene;
4. heterophasic compositions comprising: (A) a homopolymeric propylene fraction, or one of copolymers as listed under above (3) point, and (B) a copolymeric fraction formed by elastomeric ethylene copolymers with an alpha-olefin, possibly containing minor proportions of a diene, wherein the alpha-olefin is preferably selected from propylene and 1-butene;
5. elastomeric ethylene copolymers with alpha-olefins, possibly containing minor proportions of a diene.

Examples of dienes which are more commonly contained in the above said elastomeric copolymers are butadiene, ethylidene-norbornene, hexadiene 1-4.

Among polymers of olefins having formula

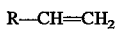

$$R\text{—}CH\text{=}CH_2$$

in which R is an aryl radical, "crystal" polystyrene and high-impact polystyrene are preferred.

Other examples of polymers which may commonly be used are acrylonitrile/butadiene/styrene (ABS) and styrene/acrylonitrile (SAN) copolymers; (polyester and polyether) polyurethane; poly(ethylene terephthalate); poly(butylene terephthalate); polyamides; and so forth.

The self-extinguishing compositions according to the present invention can be prepared according to well-known methods: for example, the composite constituted by microencapsulated ammonium polyphosphate, is added, as a finely subdivided powder (preferably with smaller particle size than 70 micrometers), to the polymer in a turbomixer, in order to form a homogeneous compound which is extruded and pelletized. The resulting granular product can be fabricated and converted into various articles of manufacture according to any of the well known molding techniques.

The flame retardant additives according to the present invention are suitable for use also in the field of flame retardant paints.

Composites constituted by ammonium polyphosphate of general formula (I) microencapsulated with 10–80% by weight of a resin obtained by polimerizing with formaldehyde only, the triazinic derivatives of general formula (II), either containing or not containing polyaminic derivatives, not cited in the examples, but which can be advantageously used as well in the self-extinguishing polymeric compositions according to the present invention, are those as reported in following Table 1, in which $R_3$, when present, is substituted by the triazinic ring of formula:

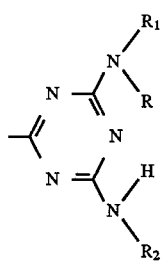

TABLE 1

| | | | Derivative of general formula (I) | |
|---|---|---|---|---|
| COMPOUND N° | R—N—R₁ | $R_2$ | $-Z-\left[\begin{array}{c}N-Z_1\\|\\ [Z_2]_a\\|\end{array}\right]_b$ | Parts by weight |
| 1 | H | H | —N⌒N— (piperazine) | 85 |
| 2 | H | H | N(CH₂CH₂NH—)₃ | 100 |
| 3 | N⌒N—CH₃ | H | —N⌒N— (piperazine) | 60 |
| 4 | H | H | —HN—⟨○⟩—CONH—⟨○⟩—NH— | 100 |
| 5 | N⌒O (morpholine) | H | —HN(CH₂)₆NH— | 55 |
| 6 | H | H | —N⌒N— (piperazine) | 100 |
| 7 | N⌒ (piperidine) | H | —HN(CH₂)₂—N—(CH₂)₂NH— | 70 |
| 8 | n-C₄H₉ | H | H | —N⌒N— (piperazine) | 100 |

TABLE 1-continued

| # | R1 | R2 | R3 | Linker | % |
|---|---|---|---|---|---|
| 9 | thiomorpholinyl (N,S ring) | H | | —N(piperazine)N— | 63 |
| 10 | CH₂CH₂OH | H | H | —N(piperazine)N— | 100 |
| 11 | morpholinyl (N,O ring) | H | | —HNCH₂—(cyclohexyl)—CH₂NH— | 60 |
| 12 | (CH₂)₃OCH₃ | H | H | —N(piperazine)N— | 100 |
| 13 | (CH₂)₃N(morpholine)O | H | H | —N(piperazine)N— | 100 |
| 14 | CH₂CH₂OH | CH₃ | H | —N(piperazine)N— | 68 |
| 15 | (CH₂)₂O(CH₂)₂OH | H | H | —N(piperazine)N— | 100 |
| 16 | CH₂CH₂OCH₃ | H | H | —N(CH₃)CH₂CH₂N(CH₃)— | 100 |
| 17 | morpholinyl (N,O ring) | H | | —HN—(phenyl)—NH— | 62 |
| 18 | H | H | H | —N(piperazine)N— | 80 |
| 19 | morpholinyl (N,O ring) | H | | —N(CH₂CH₂OH)CH₂CH₂NH— | 64 |
| 20 | H | H | H | —HN(CH₂)₃N(piperazine)N(CH₂)₃NH— | 100 |
| 21 | H | H | H | —N(2,5-dimethylpiperazine)N— | 81 |
| 22 | CH₂CH₂OCH₃ | H | H | N(CH₂CH₂NH—)₃ | 70 |
| 23 | (CH₂)₅OH | H | H | —N(piperazine)N— | 100 |

TABLE 1-continued

| | | | | |
|---|---|---|---|---|
| 24 | (piperidine ring with N) | H | —N⟨piperazine⟩N— | 67 |
| 25 | (piperazine ring: N, N—H) | H | —NH(CH$_2$)$_3$NH— | 78 |
| 26 | CH$_2$CH$_2$OCH$_3$ | H | H | —HN—C(CH$_3$)$_2$—(cyclohexyl)—C(CH$_3$)$_2$—NH— | 100 |
| 27 | (morpholine ring: N, O) | H | —HN(CH$_2$CH$_2$O)$_2$—CH$_2$CH$_2$NH— | 69 |
| 28 | C$_2$H$_5$ | H | C$_2$H$_5$ | —N⟨piperazine⟩N— | 100 |
| 29 | H | H | H | —N⟨piperazine⟩N— | 82 |
| 30 | H | H | H | —HN(CH$_2$)$_2$—N(H)—(CH$_2$)$_2$NH— | 65 |
| 31 | (CH$_2$)$_3$N(C$_2$H$_5$)$_2$ | H | —N⟨piperazine⟩N— | 59 |
| 32 | (morpholine ring: N, O) | H | —N(C$_2$H$_5$)—CH$_2$—CH=CH—CH$_2$—N(C$_2$H$_5$)— | 64 |
| 33 | CH$_2$CH$_2$OCH$_3$ | H | H | —HNCH$_2$—CH$_2$NH— | 100 |
| 34 | H | H | H | —HN(CH$_2$)$_3$—N(H)—(CH$_2$)$_3$NH— | 100 |

| COMPOUND N° | Polyaminic derivative Designation | Parts by weight | Molar ratio amines/formaldehyde | Ratio by weight APP/resin |
|---|---|---|---|---|
| 1 | Acetoguanamine | 15 | 1:8.0 | 3.2:1 |
| 2 | — | | 1:7.4 | 4.6:1 |
| 3 | Melamine | 40 | 1:9.0 | 2.7:1 |
| 4 | — | | 1:45 | 2.55:1 |
| 5 | Melamine | 45 | 1:6.5 | 3.0:1 |
| 6 | — | | 1:4.0 | 2.9:1 |
| 7 | Melamine | 30 | 1:8.0 | 2.2:1 |
| 8 | — | | 1:3.8 | 3.25:1 |
| 9 | Melamine | 37 | 1:4.8 | 1.5:1 |
| 10 | — | | 1:9.0 | 2.1:1 |
| 11 | Melamine | 40 | 1:7.5 | 3.0:1 |
| 12 | — | | 1:4.0 | 2.25:1 |
| 13 | — | | 1:3.8 | 2.85:1 |
| 14 | Melamine | 32 | 1:4.5 | 2.1:1 |
| 15 | — | | 1:5.2 | 2.5:1 |
| 16 | — | | 1:6.0 | 2.75:1 |
| 17 | Melamine | 38 | 1:8.0 | 3.0:1 |
| 18 | Succinoguanamine | 20 | 1:5.5 | 2.8:1 |
| 19 | Melamine | 36 | 1:3.5 | 2.5:1 |
| 20 | — | | 1:6.0 | 2.7:1 |
| 21 | Benzoguanamine | 19 | 1:5.2 | 4.75:1 |
| 22 | Melamine | 30 | 1:7.4 | 2.5:1 |
| 23 | — | | 1:3.2 | 2.6:1 |

TABLE 1-continued

| | | | | |
|---|---|---|---|---|
| 24 | Melamine | 33 | 1:6.5 | 4.0:1 |
| 25 | Melamine | 22 | 1:5.0 | 1.8:1 |
| 26 | — | | 1:4.4 | 2.75:1 |
| 27 | Melamine | 31 | 1:3.5 | 2.9:1 |
| 28 | — | | 1:4.0 | 3.0:1 |
| 29 | Piperazine-2,5-dione | 18 | 1:6.5 | 2.5:1 |
| 30 | Benzylguanamine | 35 | 1:8.2 | 3.5:1 |
| 31 | Melamine | 41 | 1:6.5 | 3.2:1 |
| 32 | Melamine | 36 | 1:5.3 | 2.7:1 |
| 33 | — | | 1:4.4 | 2.8:1 |
| 34 | — | | 1:7.6 | 4.2:1 |

APP = Ammonium polyphosphate Exolit 422 ® (Hoechst)

The examples disclosed in the following illustrate the features of the invention without limiting them.

As mentioned hereinabove, the effectiveness of the process for ammonium polyphosphate microencapsulation is evaluated by measuring the solubility in water at 60° C. of the resulting product, according to the following process.

A number of grammes of composite which are equal to:

$$\frac{10}{APP\%} \times 100$$

wherein:

APP % is the value of the percent content, by weight, of ammonium polyphosphate contained in the composite obtained in the examples disclosed in the following (and determined by means of elemental analysis for phosphorus content), are weighed and are charged, together with 100 cm³ of distilled water, to a reactor of 0.25 liter of capacity equipped with stirrer, thermometer, reflux condenser and heating bath.

The dispersion is heated to 60° C., and is kept at that temperature value for 20 minutes, then the dispersion is centrifuged for 45 minutes.

Subsequently, 5 cm³ of clear liquid phase is drawn and is dried in an oven at 120° C.

The solubility of ammonium polyphosphate, expressed as g/100 g of water, is calculated from the weight of the residue (APP).

A further confirmation of the encapsulation degree achieved is obtained by analysing the obtained products by scanning electron microscopy, with a CAMBRIDGE STEREOSCAN 200 model SEM, which makes it possible, besides crystal size, the type and amount to be evaluated of resin coating deposited on ammonium polyphosphate crystals.

EXAMPLE 1

184.5 g of cyanuric chloride and 1300 cm³ of methylene chloride are charged to a reactor of 3 liters of capacity, equipped with stirred, thermometer, addition funnel, refluxing condenser and cooling bath.

With cooling from the outside, 75 g of 2-methoxyethylamine and 40 g of sodium hydroxide dissolved in 150 cm³ of water are added simultaneously, within a 3 hour time, with the pH value of the mixture being kept comprised within the range of from 5 to 7, and the temperature being kept comprised within the range of from 0° to 3° C.

The reaction mixture is kept at said temperature of 0°-3° C. for a further 3 hours, then the aqueous phase is separated.

The organic solution is treated with two portions, of 200 cm³ each, of water, with the aqueous phase being separated each time.

By distillation of methylene chloride, 217 g of intermediate (XVI):

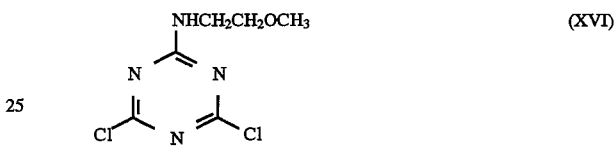

are obtained as a white crystalline powder with m.p.= 73°–75° C. (m.p.=melting point) and a chlorine content of 31.68% (theoretical chlorine content: 31.84%).

400 cm³ of acetone and 133.8 g of intermediate (XVI) are charged to a reactor of 1 liter of capacity equipped with stirring means, thermometer, addition funnel, refluxing condenser and heating bath.

The reaction mixture is heated up to 40° C. with stirring, until a solution is obtained, then, with temperature being kept constant at 40° C., 102 g of an aqueous solution of ammonia at 30%, by weight are added during a 30 minute time.

The reaction mixture is subsequently heated up to 45° C., and is kept 4 hours at that temperature, After cooling down to 10° C., the resulting product is filtered off and is washed on the same filter with cold water.

After oven drying at 100° C., 114 g of intermediate (XVII):

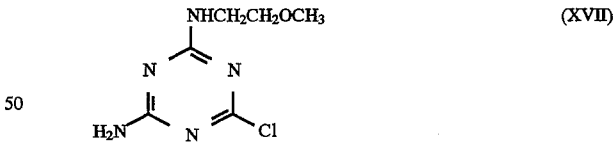

are obtained as a white cristalline powder having m.p.= 195°–197° C., and a chlorine content of 17.18% (theoretical chlorine content: 17.44%).

500 cm³ of xylene, 81.4 g of intermediate (XVII) and 17.2 g of piperazine are charged to the same reactor of 1 liter of capacity.

The resulting mixture is heated up to 100° C. and is kept 2 hours at that temperature.

Then 16 g of sodium hydroxide are added and the reaction mixture is heated up to boiling temperature. The reaction mixture is kept refluxing for approximately 20 hours, then is cooled down to room temperature, and the resulting precipitate is filtered off.

The filter cake is washed with plentiful water and is dried. 74.2 g of intermediate (XVIII):

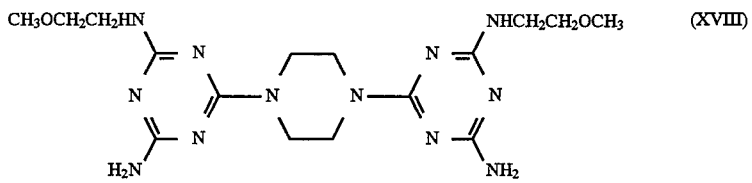

(XVIII)

with m.p.=212°–215° C. are obtained.

The structure of intermediates (XVI), (XVII) and (XVIII) was confirmed by I.R. spectroscopic analysis.

100 cm³ of water, 130 cm³ of methanol, 0.7 g of potassium carbonate, 48.6 g of an aqueous solution at 37% by weight of formaldehyde, and, with stirring, 33.6 g of intermediate (XVIII) are charged to a reactor of 0.5 liter of capacity, equipped as the preceding one.

The reaction mass is heated up to 70° C. for 30 minutes, until a good dispersion is obtained.

Such a dispersion, kept at the temperature of 70° C., is fed, during 30 minutes, to the same 1 liter reactor as disclosed hereinabove, containing a sospension constituted by 90 g of ammonium polyphosphate [Exolit 422$^{(R)}$, containing 31.4% of phosphorus], 120 cm³ of water and 120 cm³ of methanol, heated at 70° C.

The resulting mixture is heated to boiling temperature and is allowed to reflux for 10 hours, The reaction mixture is allowed to cool down to room temperature, and the resulting product is filtered off, with the filter cake being washed with a water-methanol mixture.

By drying the filter cake in an oven at 100° C., and subsequently submitting it to a heat treatment at 150° C. for 3 hours under vacuum, 120 g of a white crystalline product are obtained, which contains 22.4% of phosphorus, corresponding to a content of 71.3% by weight of ammonium polyphosphate.

The obtained product corresponds hence to ammonium polyphosphate microencapsulated with resin in a ratio of 2.48:1 by weight.

The solubility of thus encapsulated ammonium polyphosphate in water at 60° C. is of 10.4% by weight.

The solubility of Exolit$^{(R)}$ 422 in water at 60° C. is higher than 65% by weight.

EXAMPLE 2

184.5 g of cyanuric chloride and 1300 cm³ of methylene chloride are charged to the same reactor of 3 liters of capacity as disclosed in Example 1.

Then, by proceeding as disclosed in Example 1, but using 87.2 g of morpholine, 230 g of intermediate (XIX):

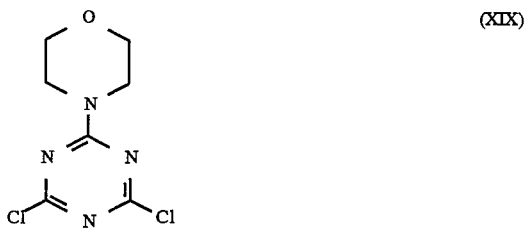

(XIX)

are obtained as a white crystalline powder with m.p.= 155°–157° C. and a chlorine content of 29.87% (theoretical value: 30.12%).

100 g of a solution at 30% by weight of ammonia, 100 cm³ of water and 70.5 g of intermediate (XIX) are charged to a reactor of 0.5 liter of capacity, equipped as in Example 1.

The reaction mixture is heated up to 50° C. and is kept 7 hours at this temperature. The reaction mixture is allowed to cool down to room temperature, the obtained product is filtered off and the filter cake is washed with water.

By drying the filter cake, 58 g of intermediate (XX):

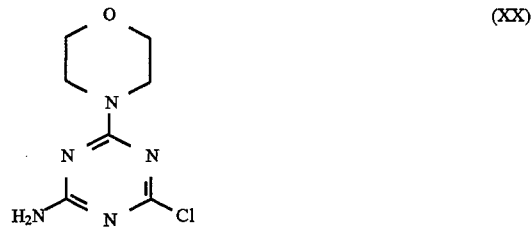

(XX)

are obtained as a white crystalline powder with m.p.= 189°–191° C. and a chlorine content of 16.28% (theoretical value: 16.47%). 400 cm³ of ortho-dichlorobenzene, 53.9 g of intermediate (XX) and 10.8 g of piperazine are added to a reactor of 1 liter of capacity, fitted as the one disclosed hereinabove.

The resulting mixture is heated up to 100° C., and is kept 2 hours at that temperature. Then, 10 g of sodium hydroxide are added and the resulting mixture is heated up to 140° C. The reaction mixture is kept 16 hours at 140° C., then is cooled down to room temperature, the resulting product is filtered off and the filter cake is washed with plentiful water.

After drying, 53.0 g of intermediate (XXI):

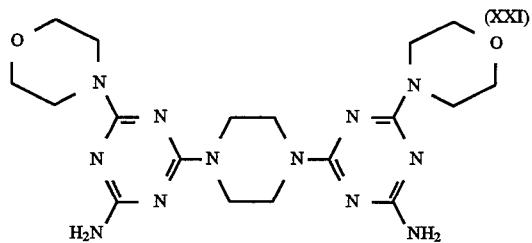

(XXI)

are obtained as a white cristalline powder having m.p.= 280°–285° C.

The structure of compounds (XIX), (XX) and (XXI) was confirmed by I.R. spectroscopic analysis.

70 cm³ of water, 0.5 g of sodium carbonate, 120 cm³ of methanol, 77.0 g of a solution at 37% by weight of formaldehyde, and, with stirring, 26.7 g of intermediate (XXI) and 16.4 g of 2,4,6-triamino-1,3,5-triazine (melamine) are added to the same reactor of 0.5 liter of capacity as in Example 1.

The resulting mixture is kept heated at 65° C. for a 45 minute time, until a good dispersion is obtained.

Such a dispersion, kept at 65° C., is fed, during approximately 30 minutes, to the same 1 liter reactor as disclosed hereinabove, containing the suspension constituted by 110 g of ammonium polyphosphate (Exolit 422$^{(R)}$) in 140 cm³ of water and 140 cm³ of methanol, heated at 65° C.

The resulting mixture is heated up to boiling temperature and is allowed to reflux for 12 hours.

The reaction mixture is allowed to cool down to room temperature, the resulting product is filtered off, and the filter cake is washed on the same filter with a water-methanol mixture.

Then, by operating according to the same operating modalities as disclosed in Example 1, 152.3 g of a white crystalline product are obtained, which contains 21.9 percent of phosphorus, corresponding to a content of 69.7% by weight of ammonium polyphosphate.

The resulting product corresponds hence to ammonium polyphosphate microencapsulated with resin, with a microencapsulation ratio of 2.3:1.

The solubility of ammonium polyphosphate in water at 60° C. is of 7.2% by weight.

EXAMPLE 3

184.5 g of cyanuric chloride and 800 cm³ of acetone are charged to a reactor of 3 liters of capacity, equipped with stirrer, thermometer, addition funnel, reflux condenser and heating bath.

With stirring, the reaction mixture is heated up to 40° C. in order to obtain a solution, then 284 g of an aqueous solution of ammonia at 30% by weight is added during a 1 hour and 30 minute time.

The reaction mixture is subsequently heated up to 45° C. and is kept 4 hours at this temperature.

After cooling, the resulting product is filtered off and is washed on the filter with water.

After oven drying at 50°–60° C. under vacuum, 113 g of intermediate (XXII):

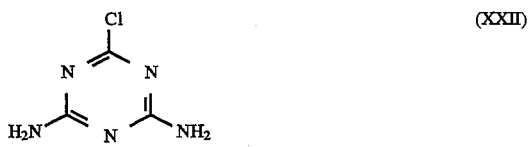

(XXII)

are obtained as a white, infusible, crystalline powder containing 24.2% of chlorine (theoretical chlorine content= 24.4%).

400 cm³ of xylene, 58.2 g of intermediate (XXII) and 17.2 g of piperazine are charged to a reactor of 1 liter of capacity, fitted as the preceding one.

The reaction mass is heated up to 100° C., and is kept 2 hours at this temperature.

Then, 16 g of sodium hydroxide in solid state are added and the resulting mixture is heated up to boiling temperature.

The reaction mixture is allowed to reflux for approximately 20 hours, then is cooled down to room temperature and is filtered.

The filter cake is washed with plentiful water and is dried. 54.2 g of intermediate (XXIII):

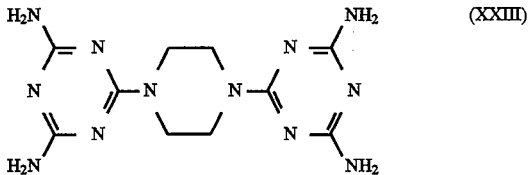

(XXIII)

are obtained as a white crystalline powder having m.p. higher than 300° C.

The structure of compounds (XXII) and (XXIII) was confirmed by I.R. spectroscopic analysis.

100 cm³ of water, 150 cm³ of methanol, 81.2 g of a solution at 37% by weight of formaldehyde and, with stirring, 30.4 g of intermediate (XXIII) are charged to the same reactor of 0.5 liter of Example 1.

The reaction mass is heated up to 70° C. for 1 hour then, while keeping the reaction temperature at 70° C., and during a 1 hour time, the resulting dispersion is charged to the 1 liter reactor of Example 1, containing the dispersion constituted by 90 g of ammonium polyphosphate (Exolit 422$^{(R)}$) in 100 cm³ of water and 100 cm³ of methanol, heated at 70° C.

The reaction is heated up to boiling temperature and is kept refluxing for 8 hours.

Then, by proceeding according to such operating modalities as disclosed in Example 1, 127.1 g of a white crystalline product are obtained which contains 21.7 percent of phosphorus, corresponding to a content of 69.1 percent by weight of ammonium polyphosphate.

The resulting product corresponds hence to an ammonium polyphosphate microencapsulated with resin with a microencapsulation ratio of 2.23:1 by weight.

The solubility of ammonium polyphosphate in water at 60° C. is of 5.5% by weight.

EXAMPLE 4

400 cm³ of water, 72.8 g of intermediate (XXII) and 15.0 g of ethylenediamine are charged to a reactor of 1 liter of capacity, equipped as in the preceding example.

The reaction mass is heated up to 95° C. and is kept at that temperature for 1 hour, then, during 3 hours, 20.0 g of sodium hydroxide in 100 cm³ of water are added.

The reaction mixture is heated up to boiling temperature and is kept under refluxing conditions for approximately 10 hours.

The reaction mixture is allowed to cool down to 40° C., the resulting product is filtered off, and the filter cake is washed on the same filter with water at 40° C.

By drying the filter cake in an oven at 100° C., 66.2 g of intermediate (XXIV):

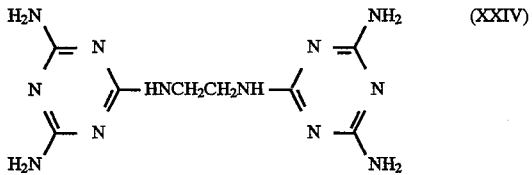

(XXIV)

are obtained as a white crystalline powder having a higher melting point than 300° C.

The structure of intermediate (XXIV) was furthermore confirmed by I.R. spectroscopic analysis.

To the same reactor of 0.5 liter of capacity of the preceding examples, 150 cm³ of water, 150 cm³ of methanol, 18.0 g of paraformaldehyde and, with stirring, 27.8 g of intermediate (XXIV) are added.

The reaction mass is heated up to 65° C. and is kept at that temperature for 1 hour, until a good dispersion is obtained.

Such a dispersion, kept at 65° C., is fed, during an approximate 1 hour time, to the same reactor of 1 liter, containing the dispersion constituted by 90.0 g of polyphosphate (Exolit 422$^{(R)}$) in 100 cm³ of water and 100 cm³ of methanol, kept heated at 65° C.

The reaction is heated up to boiling temperature and is allowed to reflux for 9 hours.

Then, by proceeding according to the same operating modalities as disclosed in the above examples, 121.4 g are obtained of a white crystalline product which contains 22.8% of phosphorus, corresponding to a content of 72.6% by weight of ammonium polyphosphate.

Therefore, the obtained product corresponds to ammonium polyphosphate microencapsulated with resin in the ratio of 2.64: 1 by weight.

The solubility of ammonium polyphosphate in water at 60° C. is of 5.2%.

EXAMPLE 5

400 cm³ of water, 86.2 g of intermediate (XX) and 20.6 g of diethylenetriamine are charged to the same reaction equipment of 1 liter of capacity of the preceding example.

The reaction mass is heated up to 80° C. for 2 hours, then 16 g of of sodium hydroxide dissolved in 30 cm³ of water are added, and the reaction mixture is heated up to boiling temperature.

The reaction mixture is allowed to reflux for approximately 14 hours, then, by proceeding as disclosed in Example 2, 86.2 g of intermediate (XXV):

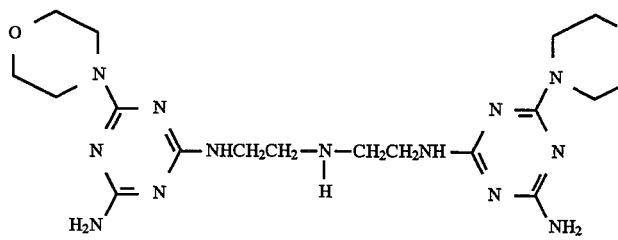

(XXV)

are obtained as a white crystalline powder with m.p.= 198°–201° C.

The structure of intermediate (XXV) was further confirmed by I.R. spectroscopic analysis.

130 cm³ of methanol, 100 cm³ of water, 53.0 g of a solution at 37% of formaldehyde by weight and, with stirring, 27.7 g of intermediate (XXV) and 13.0 g of melamine are charged to the same reactor of 0.5 liter of capacity of the preceding examples.

The reaction mixture is heated up to 65° C. and is kept at that temperature for 1 hour, then the dispersion, kept at 65° C., is fed, within a 1 hour time, to the same reactor of 1 liter of capacity already containing the dispersion, heated at 65° C., constituted by 90.0 g of ammonium polyphosphate (Exolit 422$^{(R)}$) in 150 cm³ of water and 150 cm³ of methanol.

The reaction mixture is heated up to boiling temperature and is caused to reflux for 10 hours.

By subsequently proceeding according to the same operating modalities as of the preceding examples, 130.6 g of a white crystalline product are obtained which contains 21.2 percent of phosphorus, corresponding to a content of 67.5% of ammonium polyphosphate by weight.

The obtained product corresponds hence to ammonium polyphosphate microencapsulated with resin in the ratio of 2.08:1 by weight.

The solubility of ammonium polyphosphate in water at 60° C. is of 8.1 percent.

EXAMPLE 6

184.5 g of cyanuric chloride and 700 cm³ of water are charged to a reactor of 2 liters of capacity, fitted as in Example 1.

While cooling from the outside, 133 g of bis(2-methoxyethyl)amine and 40 g of sodium hydroxide dissolved in 150 cm³ of water are fed simultaneously during a 3 hour time, with the pH value of the mixture being kept comprised within the range of from 5 to 7, and the reaction temperature being kept comprised within the range of from 0° to 3° C.

The reaction mixture is kept at the temperature of 0°–3° C. for a further 2 hours, then the resulting product is filtered off and is washed on the filter with cold water.

By drying the filter cake in an oven at 50° C., under vacuum, 254.3 g of intermediate (XXVI):

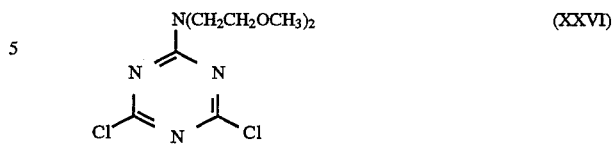

(XXVI)

are obtained as a white crystalline powder with m.p.= 63°–65° C., and a chlorine content of 25.06% (theoretical chlorine content: 25.27%).

200 g of a solution of ammonia at by weight and 500 cm³ of water are charged to a reactor of 1 liter of capacity, equipped as in the preceding examples.

The reaction mixture is heated up to 40° C. and then, during a 30 minute time, 168.6 g of intermediate (XXVI) are added, with the reaction temperature being kept at 40° C.

The reaction mixture is heated up to 45° C. and is kept at that temperature value for approximately 6 hours.

At the end, the reaction is cooled down to the temperature of 10° C. and the resulting product is filtered off, with the filter cake being washed on the same filter with cold water.

By oven drying the filter cake, 139.4 g of intermediate (XXVII):

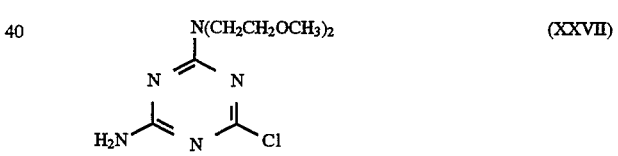

(XXVII)

are obtained as a white crystalline powder having m.p.= 87°–88° C. and containing 13.30 percent of chlorine (theoretical chlorine content: 13.57%).

The structure of intermediates (XXVI) and (XXVII) was furthermore confirmed by NMR analysis.

600 cm³ of xylene, 130.8 g of intermediate (XXVII) and 21.5 g of piperazine are charged to the same reactor of 1 liter of capacity.

The reaction mixture is heated up to 100° C. and is kept at that temperature for 2 hours. 20 g of sodium hydroxide are then added, and the reaction mixture is heated up to boiling temperature.

The reaction mass is kept under refluxing conditions for 24 hours, then is cooled down to room temperature, the resulting product is filtered off and the filter cake is washed with plentiful water.

By oven drying at 100° C., 126.1 g of intermediate (XXVIII):

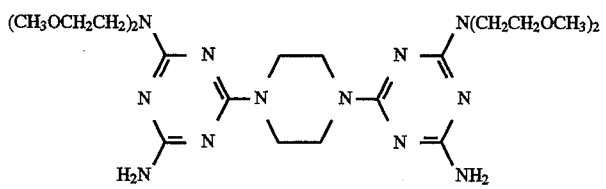

(XXVIII)

are obtained as a white crystalline powder with m.p.= 168°–170° C.

The structure of intermediate (XXVIII) is furthermore confirmed by I.R. spectroscopic analysis.

100 cm³ of water, 150 cm³ of methanol, 0.5 g of sodium carbonate, 58.4 g of a solution of formaldehyde at 37 percent by weight and, with stirring, 21.4 g of intermediate (XXVIII) and 15.1 g of melamine are added to the same reactor of 0.5 liter of capacity as used in the preceding examples.

The reaction mass is heated at 70° C. for 1 hour, until a good dispersion is obtained.

Such a dispersion, kept at 70° C., is fed, during a 30-minute time, to the same 1 liter reactor as disclosed hereinabove, containing the suspension constituted by 90.0 g of ammonium polyphosphate (Phos-Check P/40$^{(R)}$, containing 31.5 percent of phosphorus), 100 cm³ of water and 100 cm³ of methanol, heated at 70° C.

The reaction mixture is heated up to boiling temperature and is kept refluxing for 10 hours.

Then, by subsequently proceeding according to the same modalities as disclosed in the preceding examples, 127.6 g are obtained of a white crystalline product containing 21.6 percent of phosporus, corresponding to a content of 68.6 percent of ammonium polyphosphate by weight.

Therefore, the obtained product corresponds to ammonium polyphosphate microencapsulated with resin in the ratio of 2.18:1 by weight.

The solubility of ammonium polyphosphate in water at 60° C. is of 7.7 percent by weight.

The solubility of Phos-Check P/40$^{(R)}$ in water at 60° C. is higher than 65% by weight.

EXAMPLE 7–12

By operating under analogous conditions to as disclosed in Examples from 1 to 6, the compounds are prepared which are reported in following table 2.

In such structures, $R_3$, when present, is replaced by the triazinic ring having the formula:

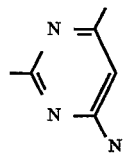

TABLE 2

| | | Derivative of general formula (I) | | | | |
|---|---|---|---|---|---|---|
| EXAMPLE N° | APP(*) | R—N—R₁ | R₂ | | $-Z-\left[\begin{array}{c}N-Z_1\\ \|\\ [Z_2]_a\\ \|\end{array}\right]_b$ | Parts by weight |
| 7 | a | (CH₂)₂OCH=CH₂ | H | H | —N⌒N— (piperazine) | 100 |
| 8 | a | H | H | H | —HN(CH₂)₂—N—(CH₂)₂NH— | 100 |
| 9 | b | H | H | H | —N⌒N— (piperazine) | 82 |
| 10 | a | N⌒O (morpholine) | | H | —HN—[(CH₂)₂—N—]₃(CH₂)₂NH— | 66 |
| 11 | b | CH₂—CH=CH₂ | H | H | —N⌒N— (piperazine) | 100 |

TABLE 2-continued

| | | | | | | | | |
|---|---|---|---|---|---|---|---|---|
| 12 | a | H | | H | H | —N⌒N— | | 100 |

| EXAMPLE N° | Polyaminic derivative Designation | Polyaminic derivative Parts by weight | Polyaminic derivative Molar ratio amines/formaldehyde | Ratio by weight APP/resin | Solubility of APP at 60° C. g/100 g of water |
|---|---|---|---|---|---|
| 7 | — | | 1:5.0 | 2.35:1 | 9.2 |
| 8 | — | | 1:8.0 | 3.5:1 | 6.1 |
| 9 | Ethylene-urea | 18 | 1:6.0 | 3.0:1 | 5.8 |
| 10 | Melamine | 34 | 1:6.5 | 2.1:1 | 8.6 |
| 11 | — | | 1:2.7 | 2.75:1 | 4.7 |
| 12 | — | | 1:4.2 | 4.45:1 | 3.4 |

(*)a - Exolit 422 ®
b - Phos-Check P/40 ®

Tables 3 and 4

The tests reported in the above said tables relate to polymeric compositions containing the composites prepared according to the preceding examples.

Specimens were prepared, which consisted of slabs having a thickness of approximately 3 mm, by moulding compounds consisting of granular polymer and additives, on a platen press MOORE, with a moulding time of 7 minutes, by operating under a pressure of 40 kg/cm$^2$.

On the resulting slabs, the level of self-extinguishment is determined by measuring the respective values of Oxygen Index (L.O.I. according to ASTM D-2863/77) on a STANTON REDCROFT instrument, and applying the "Vertical Burning Test", which makes it possible the material to be classified at the three levels 94 V-0, 94 V-1 and 94 V-2 according to UL 94 standards (published by "Underwriters Laboratories"—U.S.A.).

In Table 3, the values are reported which were obtained by using isotactic polypropylene flakes having a Melt Flow Index equal to 12, and containing 96% of insolubles in boiling n-heptane, by weight.

In Table 4, the values are reported which were obtained by using a low density polyethylene in granular form having a Melt Flow Index of 7; a granular polystyrene containing 5% by weight of polybutadienic rubber and having a Melt Flow Index equal to 9; a thermoplastic polyester polyurethane (ESTANE 54600$^{(R)}$ex Goodrich), and a thermoplastic polyether polyurethane (ESTANE 58300$^{(R)}$ ex Goodrich), both in granular form, having specific gravity values of 1.19 and 1.10 g/cm$^3$, respectively; an elastomeric ethylenepropylene copolymer containing 45% by weight of propylene; an acrylonitrile-butadiene-styrene terpolymer having a specific gravity of 1.06 g/cm$^3$, a Melt Flow Index of 1.6 and containing approximately 40% of acrylonitrile and styrene and 20% of butadiene.

TABLE 3

| Example No. | Product of Example No. | PARTS BY WEIGHT Product | PARTS BY WEIGHT PP (1) | PARTS BY WEIGHT AO (2) | L.O.I. (ASTM D 2863) | UL94 3 mm |
|---|---|---|---|---|---|---|
| 13 | 1 | 23 | 76 | 1 | 33.8 | V0 |
| 14 | 2 | 24 | 75 | 1 | 31.4 | V0 |
| 15 | 3 | 24 | 75 | 1 | 31.8 | V0 |
| 16 | 4 | 25 | 74 | 1 | 32.0 | V0 |
| 17 | 5 | 24 | 75 | 1 | 34.1 | V0 |
| 18 | 6 | 24 | 75 | 1 | 29.9 | V0 |
| 19 | 7 | 25 | 74 | 1 | 32.7 | V0 |
| 20 | 8 | 26 | 73 | 1 | 31.6 | V0 |
| 21 | 9 | 24 | 75 | 1 | 31.4 | V0 |
| 22 | 10 | 25 | 74 | 1 | 32.9 | V0 |
| 23 | 11 | 25 | 74 | 1 | 31.8 | V0 |
| 24 | 12 | 27 | 72 | 1 | 33.2 | V0 |

(1) PP = polypropylene
(2) AO = antioxidant

A mixture constituted by 2 parts of dilauryl thiopropionate and 1 part of pentaerythritol tetra [3-(3,5-di-tert-butyl-4-hydroxyphenyl)propionate].

TABLE 4

| Example No. | Polymeric Support (1) | Product of Example No. | PARTS BY WEIGHT Product | PARTS BY WEIGHT Polymer | AO (2) | L.O.I. (ASTM D 2863) | UL94 3 mm |
|---|---|---|---|---|---|---|---|
| 25 | LDPE | 1 | 29 | 70 | 1 | 30.8 | V0 |
| 26 | LDPE | 5 | 32 | 67 | 1 | 31.7 | V1 |
| 27 | LDPE | 7 | 29 | 70 | 1 | 30.1 | V1 |
| 28 | HIPS | 1 | 32 | 67 | 1 | 30.4 | V0 |

TABLE 4-continued

| Example No. | Polymeric Support (1) | Product of Example No. | PARTS BY WEIGHT Product | PARTS BY WEIGHT Polymer | AO (2) | L.O.I. (ASTM D 2863) | UL94 3 mm |
|---|---|---|---|---|---|---|---|
| 29 | HIPS | 7 | 33 | 66 | 1 | 31.0 | V0 |
| 30 | PP/PE | 1 | 30 | 69 | 1 | 31.6 | V0 |
| 31 | PP/PE | 2 | 32 | 67 | 1 | 30.8 | V0 |
| 32 | (ester) PU | 2 | 29 | 70 | 1 | 32.7 | V0 |
| 33 | (ester) PU | 3 | 29 | 70 | 1 | 34.9 | V0 |
| 34 | (ester) PU | 10 | 29 | 70 | 1 | 33.4 | V0 |
| 35 | (ether) PU | 3 | 29 | 70 | 1 | 31.1 | V0 |
| 36 | ABS | 2 | 34 | 65 | 1 | 29.4 | V0 |

(1) LDPE = low density polyethylene
HIPS = polystyrene containing 5% of butadiene rubber
(ester) PU = polyester polyurethane
(ether) PU = polyether polyurethane
PP/PE = propylene-ethylene copolymer
ABS = acrylonitrile-butadiene-styrene terpolymer
(2) AO = antioxidant
A mixture constituted by 2 parts of dilauryl thiopropionate and 1 part of pentaerythritol tetra [3-(3,5-di-tert-butyl-4-hydroxyphenyl)-propionate].

EXAMPLE 37

(Comparison Example)

31 cm³ of methanol, 49.0 g of a solution at 37% by weight of formaldehyde and, with stirring, 25.4 g of 2,4,6-triamino-1,3,5-triazine (metamine) are charged to a reaction vessel of 0.25 liter of capacity, equipped as in Example 1.

The reaction mass is heated at 60° C. for 20 minutes, until a solution is obtained.

The resulting solution, kept at the temperature of 60° C., is fed, during a 30 minute time, to a 1 liter reactor equipped as the preceding one, containing a suspension constituted by 90 g of ammonium polyphosphate (Exolit(R) 422), 200 cm³ of water and 200 cm³ of methanol, heated at 65° C.

The reaction is heated up to boiling temperature and is kept under refluxing conditions for 8 hours.

The reaction is allowed to cool down to room temperature, and the resulting product is filtered off, with the filter cake being washed on the same filter with a water-methanol mixture.

By drying the filter cake in an oven at 100° C., and submitting it to a subsequent heat treatment at 150° C., 119.0 g are obtained of a white crystalline powder containing 22.3% of phosphorus, corresponding to a content of 71.0 by weight of ammonium polyphosphate.

The obtained product corresponds hence to an ammonium polyphosphate microencapsulated with resin with a microencapsulation ratio of 2.45:1 by weight.

The solubility of ammonium polyphosphate in water at 60° C. is of 3.6% by weight.

By operating according to the same modalities as used in Examples from 13 to 25 and using the microencapsulated ammonium polyphosphate as obtained above, the following composition is prepared:

polypropylene: 75 parts by weight
antioxidant: 1 part by weight
microencapsulated ammonium polyphosphate as obtained as above: 24 parts by weight By using the above said composition, specimens were prepared which were submitted to self-extinguishment tests according to the same modalities as disclosed hereinabove.

The following results were obtained:

L.O.I.=26.5
UL94 (3 mm): class B (the specimen burns).

We claim:

1. A self-extinguishing polymeric composition comprising:
   (a) from 90 to 40 parts by weight of a thermoplastic polymer, or of a polymer endowed with elastomeric properties;
   (b) from 10 to 60 parts by weight of one or more composites constituted by ammonium polyphosphate of general formula (I):

$$(NH_4)_{n+2}P_nO_{3n+1} \quad (I)$$

wherein n stands for an integer comprised within the range of from 2 to 800, microencapsulated with 10–80% by weight of a resin obtained by:
   (A) reacting with aldehydes a mixture comprising:
      (1) from 0 to 50 parts by weight of one or more polyaminic derivatives selected from the group consisting of urea, ethyleneurea, thiourea, ethylenethiourea, propyleneurea, melamine, acetoguanamine, propionoguanamine, butyroguanamine, isobutyroguanamine, caprinoguanamine, succinoguanamine, benzoguanamine, meta methylbenzoguanamine, benzylguanamine, hydantoin, piperazine-2,5-dione and barbituric acid;
      (2) from 50 to 100 parts by weight of one or more derivatives of 2,4,6-triamino-1,3,5-triazine having the general formula (II):

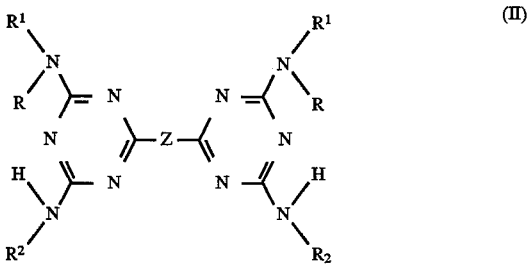

wherein:
the radicals from R to $R_2$, which may be the same, or different from each other, and which may have different meanings on each triazinic ring, are: H; $C_1$–$C_{18}$ alkyl; $C_2$–$C_8$ alkenyl; $C_6$–$C_{16}$ cycloalkyl or alkylcycloalkyl, possibly substituted with a hydroxy or $C_1$–$C_4$ hydroxyalkyl function;

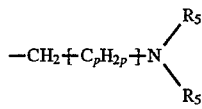

wherein:
m=an integer comprised within the range of from 1 to 7;
p=an integer comprised within the range of from 1 to 5;
$R_4$=H; $C_1$–$C_4$ alkyl; $C_2$–$C_6$ alkenyl; —O—$R_6$ wherein q is an integer comprised within the range of from 1 to 4 and $R_6$ is H or $C_1$–$C_4$ alkyl; $C_6$–$C_{12}$ cycloalkyl or alkylcycloalkyl;
the radicals $R_5$, which may be the same, or different from each other, are: H, $C_1$–$C_8$ alkyl; $C_2$–$C_6$ alkenyl; $C_6$–$C_{12}$ cycloalkyl or alkylcycloalkyl; $C_1$–$C_4$ hydroxyalkyl; or the moiety:

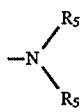

is replaced by a heterocyclic radical linked to the alkyl chain through the nitrogen atom, and possibly containing another heteroatom; or in the general formula (II) the moiety:

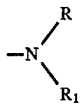

is replaced by a heterocyclic radical linked to the triazinic ring through the nitrogen atom, and possibly containing another heteroatom; Z is a divalent radical falling within the scope of one of the following formulas:

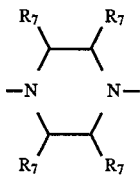

wherein the radicals $R_7$, which may be the same or different from each other, are hydrogen or $C_1$–$C_4$ alkyl;

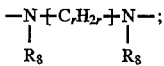

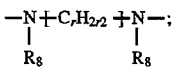

wherein r is an integer comprised within the range of from 2 to 14; $R_8$ is hydrogen; $C_1$–$C_4$ alkyl; $C_2$–$C_6$ alkenyl; $C_1$–$C_4$ hydroxyalkyl;

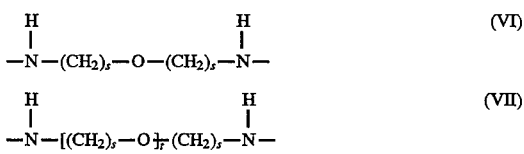

wherein s is an integer comprised within the range of from 2 to 5 and t is an integer comprised within the range of from 1 to 3;

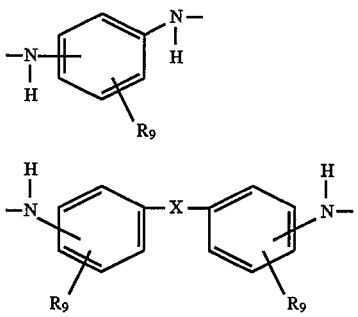

wherein; X is a direct C—C bond; O; S; S—S; SO; $SO_2$; NH; $NHSO_2$; NHCO; N=N; $CH_2$; $R_9$ is hydrogen; hydroxy; $C_1$–$C_4$ alkyl; $C_1$–$C_4$ alkoxy;

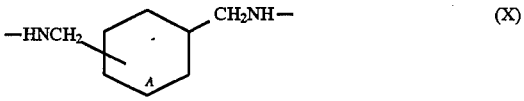

wherein A may be a saturated or unsaturated ring;

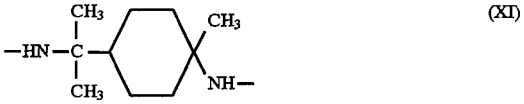

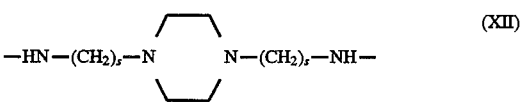

wherein s has the above defined meaning; and
(B) causing the resulting reaction product to turn into a resin by acidifying at a pH of from 1 to 5.

2. The self-extinguishing polymeric composition according to claim 1, in which the aldehyde is formaldehyde or a mixture containing formaldehyde and, up to 20% by mol, of another aldehyde having the general formula (III);

wherein $R_7$ is $C_1$–$C_8$ alkyl; $C_2$–$C_8$ alkenyl; $C_6$–$C_{12}$ cycloalkyl; $C_6$–$C_{12}$ aryl.

3. The self-extinguishing polymeric composition according to claim 2, in which the aldehyde is formaldehyde.

4. The self-extinguishing polymeric composition according to claim 1, in which the (b) component is constituted by ammonium polyphosphate of general formula (I) microencapsulated with a resin obtained by means of the polymerization with formaldehyde of a triazinic derivative of general formula (II).

5. The self-extinguishing polymeric composition according to claim 1, in which the (b) component is constituted by ammonium polyphosphate having the general formula (I) microencapsulated with a resin obtained by means of the polymerization with formaldehyde, of a mixture constituted by a triazinic derivative of general formula (II) and melamine.

6. The self-extinguishing polymeric composition according to claim 1, in which R and/or $R_1$ in general formula (II) are equal to hydrogen.

7. The self-extinguishing polymeric composition according to claim 1, in which the moiety:

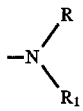

in general formula (II) is replaced by a heterocyclic radical selected from:

aziridine; pyrrolidine; piperidine; morpholine; thiomorpholine; piperazine; 4-methylpiperazine; 4-ethylpiperazine; 2-methylpiperazine; 2,5-dimethylpiperazine; 2,3,4,5-tetramethylpiperazine; 2,2,5,5-tetramethylpiperazine; 2-ethylpiperazine; and 2,5-diethylpiperazine.

8. The self-extinguishing polymeric composition according to claim 1, in which at least one of radicals from R to $R_2$ in general formula (II) is replaced by a moiety:

wherein:
m is an integer comprised within the range of from 1 to 3 and
$R_4$ is hydrogen or $C_1$–$C_4$ alkyl.

9. The self-extinguishing polymeric composition according to claim 1, in which the moiety:

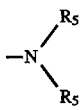

is replaced by a heterocyclic radical selected from: pyrrolidine; piperidine; morpholine; thiomorpholine; piperazine; 4-methylpiperazine; and 4-ethylpiperazine.

10. The self-extinguishing polymeric composition according to claim 1, in which the (a) polymer is selected from among polymers and copolymers of olefins having the general formula $$R-CH=CH_2$$

wherein R is a hydrogen atom or a $C_1$–$C_8$ alkyl or aryl radical; acrylonitrile-butadiene-styrene (ABS) copolymers; styrene-acrylonitrile copolymers (SAN); polyurethane; poly(ethylene terephthalate); poly(butylene terephthalate); and polyamides.

11. The self-extinguishing polymeric composition according to claim 10, wherein the polymers and copolymers of olefins are selected from:

1. isotactic or prevailingly isotactic polypropylene;
2. HDPE, LLDPE, LDPE polyethylene;
3. crystalline propylene copolymers with minor proportions of ethylene and/or other alpha-olefins, such as 1-butene, 1-hexene, 1-octene, 4-methyl-1-pentene;
4. heterophasic compositions comprising: (A) a homopolymeric propylene fraction, or one of the copolymers as listed under above (3) point, and (B) a copolymeric fraction formed by elastomeric ethylene copolymers with an alpha-olefin, possibly containing minor proportions of a diene, wherein the alpha-olefin is preferably selected from propylene and 1-butene; and
5. elastomeric ethylene copolymers with alpha-olefins, possibly containing minor proportions of a diene.

12. A molded article of manufacture, obtained from a composition according to claim 1.

13. A self-extinguishing polymeric composition comprising:

(a) from 90 to 40 parts by weight of a thermoplastic polymer, or of a polymer endowed with elastomeric properties; (b) from 10 to 60 parts by weight of one or more composites constituted by ammonium polyphosphate of general formula (I):

$$(NH_4)_{n+2}P_nO_{3n+1} \quad (I)$$

wherein n stands for an integer comprised within the range of from 2 to 800, microencapsulated with 10–80% by weight of a resin obtained by:

(A') reacting with aldehydes a mixture comprising:
(1) from 0 to 50 parts by weight of one or more polyaminic derivatives selected from the group consisting of urea, ethyleneurea, thiourea, ethylenethiourea, propyleneurea, melamine, acetoguanamine, propionoguanamine, butyroguanamine, isobutyroguanamine, caprinoguanamine, succinoguanamine, benzoguanamine, meta methylbenzoguanamine, benzylguanamine, hydantoin, piperazine-2,5-dione and barbituric acid;
(2) from 50 to 100 parts by weight of one or more derivatives of 2,4,6-triamino-1,3,5-triazine having the general formula (XIII):

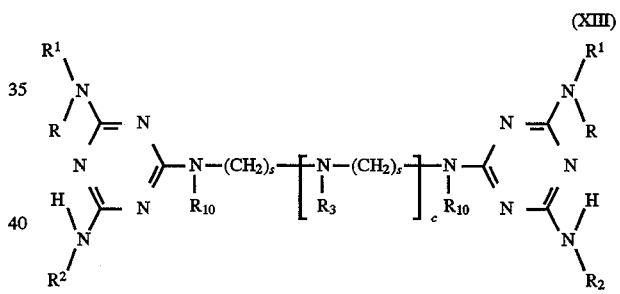

wherein:
the radicals from R to $R_2$, which may be the same, or different from each other, and which may have different meanings on each triazinic ring, are: H; $C_1$–$C_{18}$ alkyl; $C_2$–$C_8$ alkenyl; $C_6$–$C_{16}$ cycloalkyl or alkylcycloalkyl, possibly substituted with a hydroxy or $C_1$–$C_4$ hydroxyalkyl function;

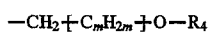

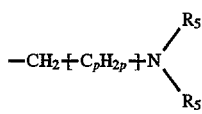

wherein:
m=an integer comprised within the range of from 1 to 7;
p=an integer comprised within the range of from 1 to 5;
$R_4$=H; $C_1$–$C_4$ alkyl; $C_2$–$C_6$ alkenyl; —O—$R_6$ wherein q is an integer comprised within the range of from 1 to 4 and $R_6$ is H or $C_1$–$C_4$ alkyl; $C_6$–$C_{12}$ cycloalkyl or alkylcycloalkyl;

the radicals $R_5$, which may be the same, or different from each other, are: H, $C_1$–$C_8$ alkyl; $C_2$–$C_6$ alkenyl; $C_6$–$C_{12}$ cycloalkyl or alkylcycloalkyl; $C_1$–$C_4$ hydroxyalkyl; or the moiety:

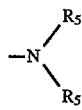

is replaced by a heterocyclic radical linked to the alkyl chain through the nitrogen atom, and possibly containing another heteroatom; or in the general formula (XIII) the moiety:

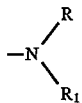

is replaced by a heterocyclic radical linked to the triazinic ring through the nitrogen atom, and possibly containing another heteroatom;

$R_3$ is hydrogen or:

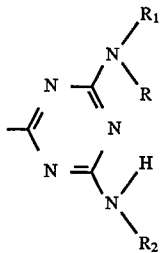

and its meaning may vary within each repeating unit; and wherein:

$R_{10}$ is hydrogen or $C_1$–$C_4$ alkyl;

c is an integer comprised within the range of from 1 to 5;

the index s, which may be the same, or different from each other, is an integer comprised within the range of from 2 to 5; and (B') causing the resulting reaction product to turn into a resin by acidifying at a pH of from 1 to 5.

14. The self-extinguishing polymeric composition according to claim 13, in which the aldehyde is formaldehyde or a mixture containing formaldehyde and, up to 20% by mol, of another aldehyde having the general formula (III);

$$R_7\text{—CHO} \qquad (III)$$

wherein $R_7$ is $C_1$–$C_8$ alkyl; $C_2$–$C_8$ alkenyl; $C_6$–$C_{12}$ cycloalkyl; $C_6$–$C_{12}$ aryl.

15. The self-extinguishing polymeric composition according to claim 14, in which the aldehyde is formaldehyde.

16. The self-extinguishing polymeric composition according to claim 13, in which the (b) component is constituted by ammonium polyphosphate of general formula (I) microencapsulated with a resin obtained by means of the polymerization with formaldehyde of a triazinic derivative of general formula (XIII).

17. The self-extinguishing polymeric composition according to claim 13, in which the (b) component is constituted by ammonium polyphosphate having the general formula (I) microencapsulated with a resin obtained by means of the polymerization with formaldehyde, of a mixture constituted by a triazinic derivative of general formula (XIII) and melamine.

18. The self-extinguishing polymeric composition according to claim 13, in which R and/or $R_1$ in general formula (XIII) are equal to hydrogen.

19. The self-extinguishing polymeric composition according to claim 13, in which the moiety:

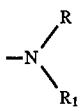

in general formula (XIII) is replaced by a heterocyclic radical selected from:

aziridine; pyrrolidine; piperidine; morpholine; thiomorpholine; piperazine; 4-methylpiperazine; 4-ethylpiperazine; 2-methylpiperazine; 2,5-dimethylpiperazine; 2,3,4,5-tetramethylpiperazine; 2,2,5,5-tetramethylpiperazine; 2-ethylpiperazine; and 2,5-diethylpiperazine.

20. The self-extinguishing polymeric composition according to claim 13, in which at least one of radicals from R to $R_2$ in general formula (XIII) is replaced by a moiety:

$$-CH_2-[-C_mH_{2m}-]-O-R_4$$

wherein:

m is an integer comprised within the range of from 1 to 3 and $R_4$ is hydrogen or $C_1$–$C_4$ alkyl.

21. The self-extinguishing polymeric composition according to claim 13, in which the moiety:

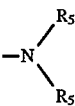

is replaced by a heterocyclic radical selected from: pyrrolidine; piperidine; morpholine; thiomorpholine; piperazine; 4-methylpiperazine; and 4-ethylpiperazine.

22. The self-extinguishing polymeric composition according to claim 13, in which the (a) polymer is selected from among polymers and copolymers of olefins having the general formula $$R\text{—CH=CH}_2$$

wherein R is a hydrogen atom or a $C_1$–$C_8$ alkyl or aryl radical; acrylonitrile-butadiene-styrene (ABS) copolymers; styrene-acrylonitrile copolymers (SAN); polyurethane; poly (ethylene terephthalate); poly(butylene terephthalate); and polyamides.

23. The self-extinguishing polymeric composition according to claim 22, wherein the polymers and copolymers of olefins are selected from:

1. isotactic or prevailingly isotactic polypropylene;
2. HDPE, LLDPE, LDPE polyethylene;
3. crystalline propylene copolymers with minor proportions of ethylene and/or other alpha-olefins, such as 1-butene, 1-hexene, 1-octene, 4-methyl-1-pentene;
4. heterophasic compositions comprising: (A) a homopolymeric propylene fraction, or one of the copolymers as listed under above (3) point, and (B) a copolymeric fraction formed by elastomeric ethylene copolymers with an alpha-olefin, possibly containing minor proportions of a diene, wherein the alpha-olefin is preferably selected from propylene and 1-butene; and 5. elastomeric ethylene copolymers with alpha-olefins, possibly containing minor proportions of a diene.

24. A molded article of manufacture, obtained from a composition according to claim 13.

25. A self-extinguishing polymeric composition comprising:
(a) from 90 to 40 parts by weight of a thermoplastic polymer, or of a polymer endowed with elastomeric properties;
(b) from 10 to 60 parts by weight of one or more composites constituted by ammonium polyphosphate of general formula (I):

$$(NH_4)_{n+2}P_nO_{3n+1} \qquad (I)$$

wherein n stands for an integer comprised within the range of from 2 to 800, microencapsulated with 10–80% by weight of a resin obtained by:
(A") reacting with aldehydes a mixture comprising:
(1) from 0 to 50 parts by weight of one or more polyaminic derivatives selected from the group consisting of urea, ethyleneurea, thiourea, ethylenethiourea, propyleneurea, melamine, acetoguanamine, propionoguanamine, butyroguanamine, isobutyroguanamine, caprinoguanamine, succinoguanamine, benzoguanamine, meta methylbenzoguanamine, benzylguanamine, hydantoin, piperazine-2,5-dione and barbituric acid;
(2) from 50 to 100 parts by weight of one or more derivatives of 2,4,6-triamino-1,3,5-triazine having the general formula (XIV):

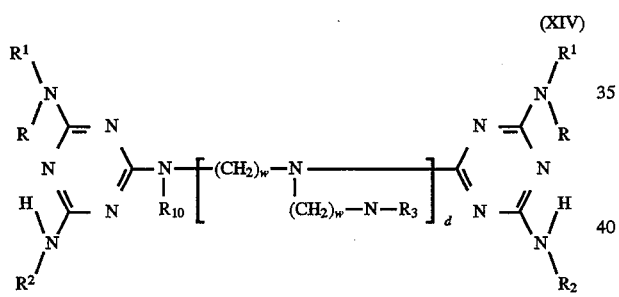

(XIV)

wherein:
the radicals from R to $R_2$, which may be the same, or different from each other, and which may have different meanings on each triazinic ring, are: H; $C_1$–$C_{18}$ alkyl; $C_2$–$C_8$ alkenyl; $C_6$–$C_{16}$ cycloalkyl or alkylcycloalkyl, possibly substituted with a hydroxy or $C_1$–$C_4$ hydroxyalkyl function;

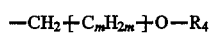

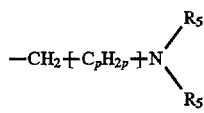

wherein:
m=an integer comprised within the range of from 1 to 7;
p=an integer comprised within the range of from 1 to 5;
$R_4$=H; $C_1$–$C_4$ alkyl; $C_2$–$C_6$ alkenyl; —O—$R_6$ wherein q is an integer comprised within the range of from 1 to 4 and $R_6$ is H or $C_1$–$C_4$ alkyl; $C_6$–$C_{12}$ cycloalkyl or alkylcycloalkyl;

the radicals $R_5$, which may be the same, or different from each other, are: H, $C_1$–$C_8$ alkyl; $C_2$–$C_6$ alkenyl; $C_6$–$C_{12}$ cycloalkyl or alkylcycloalkyl; $C_1$–$C_4$ hydroxyalkyl; or the moiety:

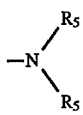

is replaced by a heterocyclic radical linked to the alkyl chain through the nitrogen atom, and possibly containing another heteroatom; or in the general formula (XIV) the moiety:

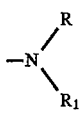

is replaced by a heterocyclic radical linked to the triazinic ring through the nitrogen atom, and possibly containing another heteroatom; $R_3$ is hydrogen or:

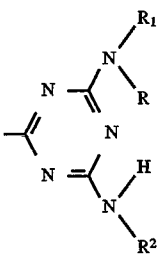

and its meaning may vary within each repeating unit;
wherein:
$R_{10}$ is hydrogen or $C_1$–$C_4$ alkyl;
w is an integer comprised within the range of from 2 to 4;
d is either 1 or 2; and
(B") causing the resulting reaction product to turn into a resin by acidifying at a pH of from 1 to 5.

26. The self-extinguishing polymeric composition according to claim in which the aldehyde is formaldehyde or a mixture containing formaldehyde and, up to 20% by mol, of another aldehyde having the general formula (III);

$$R_7\text{—CHO} \qquad (III)$$

wherein $R_7$ is $C_1$–$C_8$ alkyl; $C_2$–$C_8$ alkenyl; $C_6$–$C_{12}$ cycloalkyl; $C_6$–$C_{12}$ aryl.

27. The self-extinguishing polymeric composition according to claim 26, in which the aldehyde is formaldehyde.

28. The self-extinguishing polymeric composition according to claim 25, in which the (b) component is constituted by ammonium polyphosphate of general formula (I) microencapsulated with a resin obtained by means of the polymerization with formaldehyde of a triazinic derivative of general formula (XIV).

29. The self-extinguishing polymeric composition according to claim 25, in which the (b) component is constituted by ammonium polyphosphate having the general formula (I) microencapsulated with a resin obtained by means of the polymerization with formaldehyde, of a mixture constituted by a triazinic derivative of general formula (XIV) and melamine.

30. The self-extinguishing polymeric composition according to claim 25, in which R and/or $R_1$ in general formula (XIV) are equal to hydrogen.

31. The self-extinguishing polymeric composition according to claim 25, in which the moiety:

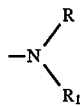

in general formula (XIV) is replaced by a heterocyclic radical selected from:

aziridine; pyrrolidine; piperidine; morpholine; thiomorpholine; piperazine; 4-methylpiperazine; 4-ethylpiperazine; 2-methylpiperazine; 2,5-dimethylpiperazine; 2,3,4,5-tetramethylpiperazine; 2,2,5,5-tetramethylpiperazine; 2-ethylpiperazine; and 2,5-diethylpiperazine.

32. The self-extinguishing polymeric composition according to claim 25, in which at least one of radicals from R to $R_2$ in general formula (XIV) is replaced by a moiety:

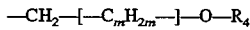

wherein:

m is an integer comprised within the range of from 1 to 3 and $R_4$ is hydrogen or $C_1$–$C_4$ alkyl.

33. The self-extinguishing polymeric composition according to claim 25, in which the moiety:

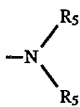

is replaced by a heterocyclic radical selected from: pyrrolidine; piperidine; morpholine; thiomorpholine; piperazine; 4-methylpiperazine; and 4-ethylpiperazine.

34. The self-extinguishing polymeric composition according to claim 25, in which the (a) polymer is selected from among polymers and copolymers of olefins having the general formula

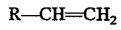

wherein R is a hydrogen atom or a $C_1$–$C_8$ alkyl or aryl radical; acrylonitrile-butadiene-styrene (ABS) copolymers; styrene-acrylonitrile copolymers (SAN); polyurethane; poly(ethylene terephthalate); poly(butylene terephthalate); and polyamides.

35. The self-extinguishing polymeric composition according to claim 34, wherein the polymers and copolymers of olefins are selected from:

1. isotactic or prevailingly isotactic polypropylene;
2. HDPE, LLDPE, LDPE polyethylene;
3. crystalline propylene copolymers with minor proportions of ethylene and/or other alpha-olefins, such as 1-butene, 1-hexene, 1-octene, 4-methyl-1-pentene;
4. heterophasic compositions comprising: (A) a homopolymeric propylene fraction, or one of the copolymers as listed under above (3) point, and (B) a copolymeric fraction formed by elastomeric ethylene copolymers with an alpha-olefin, possibly containing minor proportions of a diene, wherein the alpha-olefin is preferably selected from propylene and 1-butene; and
5. elastomeric ethylene copolymers with alpha-olefins, possibly containing minor proportions of a diene.

36. A molded article of manufacture, obtained from a composition according to claim 25.

* * * * *